United States Patent
Kuhens

(10) Patent No.: US 9,346,414 B1
(45) Date of Patent: May 24, 2016

(54) GPS/SONAR DISPLAY MOUNTING ASSEMBLY

(71) Applicant: Steven Randy Kuhens, Gilbertsville, KY (US)

(72) Inventor: Steven Randy Kuhens, Gilbertsville, KY (US)

( * ) Notice: Subject to any disclaimer, the term of this patent is extended or adjusted under 35 U.S.C. 154(b) by 0 days.

(21) Appl. No.: 14/196,252

(22) Filed: Mar. 4, 2014

(51) Int. Cl.
  *E04G 3/00* (2006.01)
  *B60R 11/02* (2006.01)
  *F16M 11/02* (2006.01)
  *A47F 5/00* (2006.01)
  *F16C 11/00* (2006.01)
  *F16D 3/00* (2006.01)
  *B60R 11/00* (2006.01)
  *B63B 17/00* (2006.01)

(52) U.S. Cl.
  CPC ..... *B60R 11/0258* (2013.01); *B60R 2011/0005* (2013.01); *B60R 2011/0052* (2013.01); *B60R 2011/0078* (2013.01); *B63B 2017/0054* (2013.01); *Y10T 403/32361* (2015.01)

(58) Field of Classification Search
  CPC ............ F16M 11/10; F16M 2200/024; F16M 11/2021; F16M 11/041; F16M 13/02; F16M 13/022; B60R 2011/0085; B60R 11/02; B60R 2011/0005; B60R 11/0258; Y10S 248/917; Y10S 248/918; Y10S 248/922; Y10S 248/923; Y10S 248/924; Y10T 403/3236; Y10T 403/32368; Y10T 403/32336; Y10T 403/32327; Y10T 403/32262; Y10T 403/32377; F16C 11/10; B62B 7/008; B63B 2017/0009; B63B 17/0054
  USPC ................... 248/292.12, 288.11, 291.1, 514; 224/483, 545, 547, 553, 555, 929; 403/96–98
  See application file for complete search history.

(56) References Cited

U.S. PATENT DOCUMENTS

| | | | | |
|---|---|---|---|---|
| 3,964,612 A | * | 6/1976 | Skilliter et al. | 211/26 |
| 3,965,705 A | * | 6/1976 | Nadler | 70/58 |
| 3,984,161 A | * | 10/1976 | Johnson | 312/7.1 |
| 4,079,604 A | * | 3/1978 | Anderegg | 70/58 |
| 4,082,387 A | * | 4/1978 | Davis | 312/242 |
| 4,103,982 A | * | 8/1978 | Rudd | 439/297 |
| 4,600,355 A | * | 7/1986 | Johnson | 414/680 |
| 4,828,240 A | * | 5/1989 | Longenecker et al. | 269/47 |
| 5,060,260 A | * | 10/1991 | O'Connell | 379/454 |
| 5,076,079 A | * | 12/1991 | Monoson et al. | 70/58 |
| 5,320,311 A | * | 6/1994 | Jensen et al. | 248/27.1 |
| 5,433,414 A | * | 7/1995 | Vieira | 248/316.4 |
| 6,019,332 A | * | 2/2000 | Sweere et al. | 248/284.1 |
| 6,113,047 A | * | 9/2000 | Wung et al. | 248/284.1 |
| 6,370,037 B1 | | 4/2002 | Schoenfish | |
| 6,446,285 B1 | * | 9/2002 | Chinn | 5/507.1 |
| 6,457,618 B1 | * | 10/2002 | Hancock et al. | 224/401 |

(Continued)

OTHER PUBLICATIONS

Bass Boat Technologies Dual Mount; Prior to Mar. 4, 2014.

*Primary Examiner* — Syed A Islam
*Assistant Examiner* — Taylor Morris
(74) *Attorney, Agent, or Firm* — Middleton Reutlinger

(57) ABSTRACT

A GPS/sonar display mounting assembly is provided which is mountable to a dashboard console of a vehicle, which may include but is not limited to boat, automobile, aircraft or the like. The mounting structure provides that mounting assembly may be utilized with displays and GPS/sonar equipment of various manufacturers while being adjustable in at least three directions to allow for comfortable use of the display by a user. Further, the mounting assembly provides for retention of the display in a desired position once set by the user despite choppy conditions which typically cause prior art mounting assemblies to slip and move from a preferred position.

16 Claims, 7 Drawing Sheets

(56) References Cited

U.S. PATENT DOCUMENTS

| | | |
|---|---|---|
| 6,529,381 B1 | 3/2003 | Schoenfish |
| 7,464,976 B2 * | 12/2008 | Smith .............................. 296/3 |
| 2001/0004100 A1 * | 6/2001 | Iltsuka ......................... 248/371 |
| 2006/0243770 A1 * | 11/2006 | Kortbein et al. .............. 224/547 |
| 2007/0045368 A1 * | 3/2007 | Lavelle ........................ 224/524 |
| 2007/0075202 A1 * | 4/2007 | Gordon ..................... 248/289.11 |
| 2008/0099521 A1 * | 5/2008 | Huang et al. .................. 224/483 |
| 2010/0065597 A1 * | 3/2010 | Grater et al. .................. 224/555 |

* cited by examiner

GPS/SONAR DISPLAY MOUNTING ASSEMBLY

CROSS-REFERENCE TO RELATED DOCUMENTS

None.

FIELD OF THE INVENTION

Present embodiments relate generally to a GPS/sonar display mounting assembly. More specifically, present embodiments relate to an adjustable mounting assembly for a sonar display utilized on marine craft.

BACKGROUND

GPS/Sonar displays, typically utilized in marine vessels, for example "bass fishing boats," are flush mounted on dashboard consoles of most fishing boats. There are various problems associated with such flush mounting. First, displays are not adjustable to vary the glare created by sunlight shining on the display module. Second, such flush mounted displays are generally not removable from the boat and therefore when a boat is stored in a parking lot, for example a hotel or boat launch parking lot prior to a day of fishing, there is a likelihood of attempted theft as a GPS/sonar display may be visible to a potential thief. Third, current mounting configurations typically position the display partially behind the steering wheel which may block the view of the user depending on the position of the steering will relative to the display. Finally, with flush mounted devices, there is a lack of adjustability of the display which leads to uncomfortable or difficulty in use of the device.

It would be desirable to overcome these and other deficiencies in known GPS/sonar display mounting arrangements so as to provide an adjustable mounting system which allows for removal of the display from the boat and which may accommodate sonar displays of various manufacturers. It would further be desirable to provide an adjustment system which is rigid when mounted so that the sonar display does not move from a desired position once it is set.

SUMMARY

A GPS/sonar display mounting assembly is provided which is mountable to a dashboard console of a vehicle, which may include but is not limited to boat, automobile, aircraft or the like. The mounting structure provides that mounting assembly may be utilized with displays and GPS/sonar equipment of various manufacturers while being adjustable in at least three directions to allow for comfortable use of the display by a user. The mounting assembly also provides for easy removal of the GPS/sonar display from the boat when the boat is not in operation, which will reduce attempted thefts of the display. Further, the mounting assembly provides for retention of the display in a desired position once set by the user despite choppy water conditions which typically cause prior art mounting assemblies to slip and allow movement of the display from a preferred position.

According to some embodiments, a GPS/sonar mounting assembly comprises a console plate for positioning on a marine craft dashboard, a first mounting arm connected to the console plate, a second mounting arm removably connected to the console plate, the second mounting arm being adjustable in a lateral direction, the console plate and the first and second mounting arms being movable to various positions in a direction perpendicular to the lateral direction, the second mounting arm having a quick disconnect fastener, the mounting arms allowing tilting adjustment of a display.

Optionally, the first and second mounting arms may receive replaceable washers. The replaceable washers may include one of a fitment for engaging the first and second mounting arms and a receiver for engaging the first and second mounting arms for inhibiting rotation of the replaceable washer relative to the mounting arms. The replaceable washers may include one of a fitment for engaging the display and a receiver for engaging the display. The replaceable washer may have a plurality of teeth inhibiting rotation of the display relative to the washer. The replaceable washers allow connection of displays of different manufacturers with the first and second mounting arms. The GPS/sonar mounting assembly further comprises a quick release connect for retaining the display between the first and second mounting arms. The first and second mounting arms may space the display from the console plate. The tilting adjustment may allow reduction of glare on the display. The mounting assembly may be adjustable in two planar directions and rotatable about an axis parallel to the planar directions. The GPS/sonar mounting assembly may further comprise a wire port passing through the plate for sonar system wires.

According to some embodiments, a GPS/sonar mounting display assembly, comprises a console plate positionable on a console of a vehicle, a first mounting arm and a second mounting arm connected to the console plate, at least one of the first and second mounting arms being adjustable in two directions relative to the console plate, a gimble mount at each end of said first and second mounting arms, the gimble mounts allowing rotatable adjustment of a display disposed between the first and second mounting arms.

Optionally, ends of the first and second mounting arms may be spaced from the console plate. The display may be pivotable at the ends of the first and second mounting arms. The GPS/sonar mounting assembly may further comprise an interchangeable washer at the ends of the first and second mounting arms.

All of the above outlined features are to be understood as exemplary only and many more features and objectives of the structures and methods may be gleaned from the disclosure herein. Therefore, no limiting interpretation of the summary is to be understood without further reading of the entire specification, claims and drawings included herewith.

BRIEF DESCRIPTION OF THE ILLUSTRATIONS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

Figure 1:
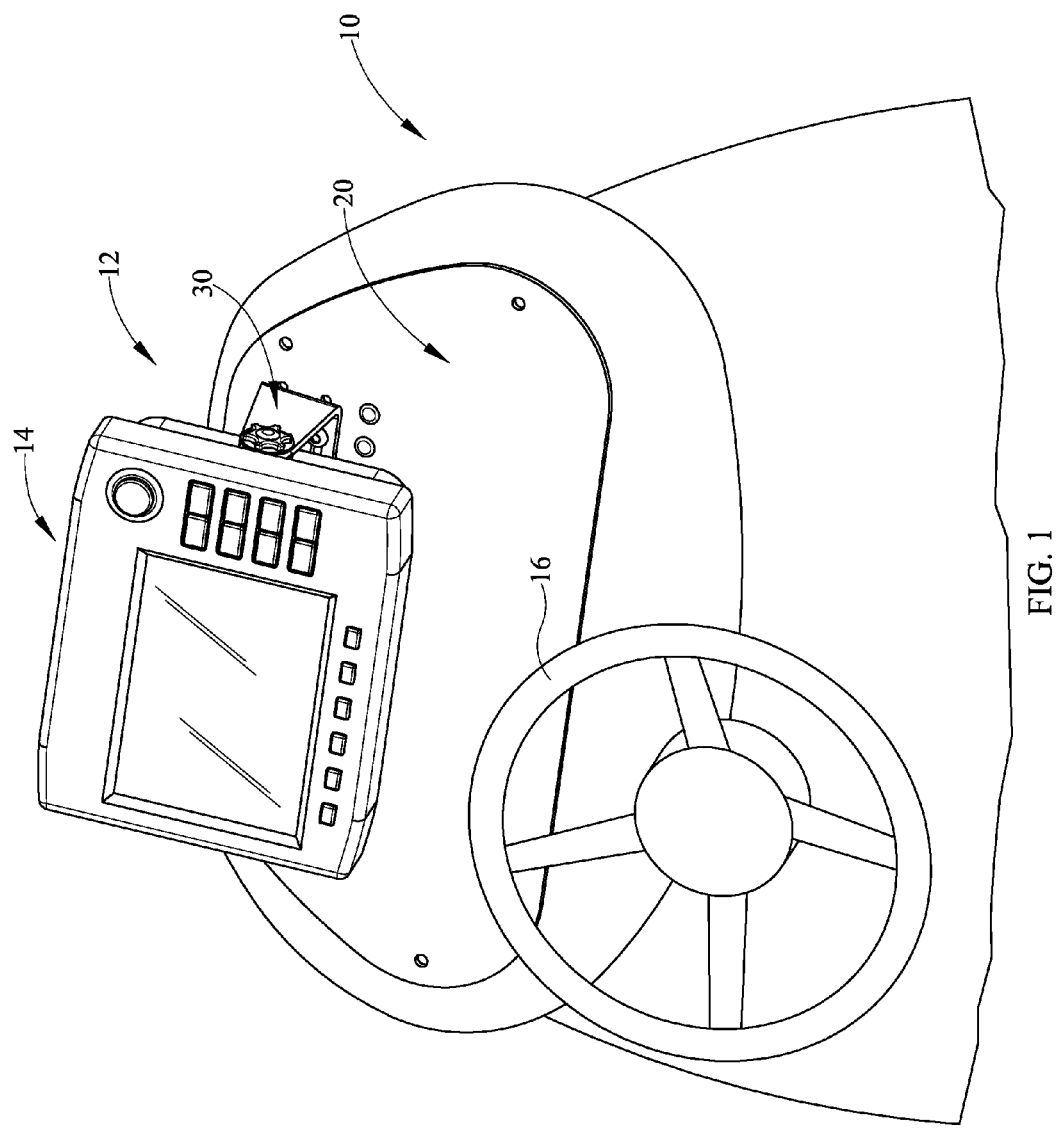
FIG. 1 is a perspective view of an exemplary vehicle dashboard console including an exemplary sonar display mounting assembly.

It is to be understood that the invention is not limited in its application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Embodiments of a GPS/sonar display mounting assembly are depicted in FIGS. 1-8. The sonar display mounting assembly allows for adjustment in at least three directions in order to improve the usability of the display for a user. The mounting assembly also allows easy removal of the display from a vehicle, for example when the boat may be stored or located in a public parking lot or other outdoor location making the display an easy target for theft. The display mounting assembly further allows for mounting of various displays and therefore, providing easy interchangeability and usability in various types of boats and with various types of displays.

Referring initially to FIG. 1, a perspective view of a vehicle dashboard console 10 is depicted having a sonar display mounting assembly 12 thereon. The term vehicle is meant to include, but not necessarily be limited to, a boat, automobile or aircraft. The GPS/sonar display mounting assembly 12 includes a console plate which is fastened to the boat dashboard console 10. The GPS/sonar display mounting assembly 12 raises the position of the display 14 so that a steering wheel 16 does not interfere with use of the display 14. Additionally, the display mounting assembly 12 is spaced from the steering wheel 16 and the console 10 in order to allow or adjustment of the display 14 in multiple directions and/or dimensions. The display may be for GPS, sonar or a combination therefore depending on the application.

The display mounting assembly 12 includes a console plate 20 which is positioned on the marine craft dashboard console 10. The display mounting assembly 12 further comprises at least one mounting arm 30 which is adjustably positioned on the console plate 20. The sonar display 14 is adjustably connected to the at least one mounting arm 30. The assembly 12 provides for two directions of adjustment between the mounting arm 30 and the console plate 20. A third adjustment is provided between the display 14 and the mounting arm 30. The display 14 may therefore be moved in a generally vertical direction, a generally horizontal direction and may be rotated relative to the mounting arm 30.

It should be understood that the vehicle dashboard console 10 will vary. For example in boats, shape may vary from manufacturer to manufacturer and across various lines of boats from a single manufacturer. Therefore, the console plate 20 will vary in shape and size according to the type of boat for which the console plate 20 and display mounting assembly 12 will be utilized.

Figure 2:
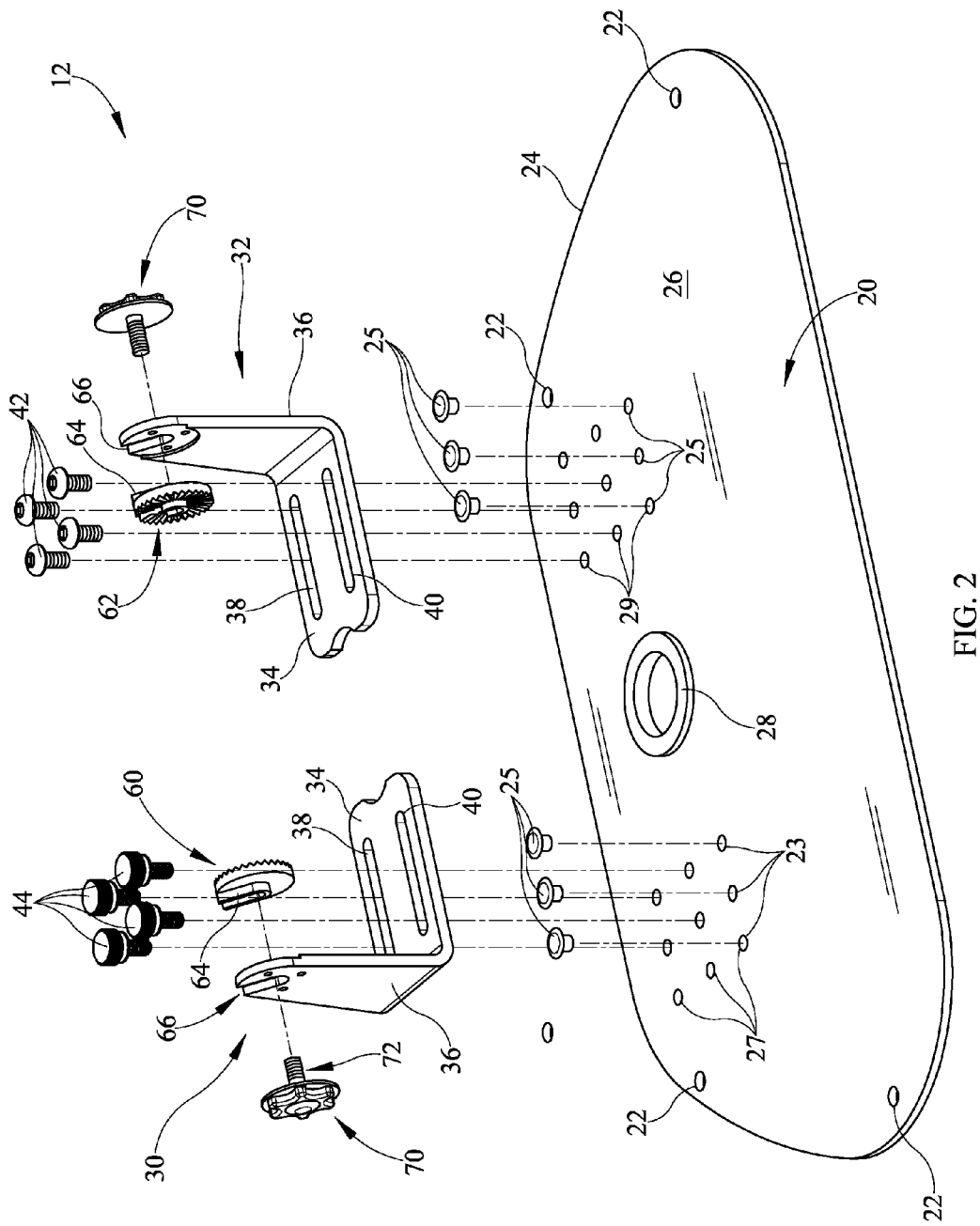
FIG. 2 is an exploded perspective view of the exemplary GPS/sonar mounting display of FIG. 1.

Referring now to FIG. 2, an exploded perspective view of the GPS/sonar display mounting assembly 12 is depicted. The console plate 20 is shaped to match a boat dashboard console 10 (FIG. 1). As previously indicated, the shape of the console 10 may vary across different lines of boats from the same manufacturer. Therefore, the console plate 20 may be formed in various shapes to accommodate the various manufacturers and models of boats or other type vehicles.

According to one exemplary embodiment, the console plate 20 may be formed of one-quarter inch aluminum with a finish which is resilient and durable. For example, the aluminum may be finished with a hammertone powder coat paint in order to increase the durability while providing an attractive finish to the aluminum material. However, this is merely exemplary and other materials and finishes may be utilized. The console plate 20 may include a plurality of fastening apertures 22 which may vary in location and size again according to the corresponding connection hardware within the dashboard console 10. The plate 20 has an outer edge 24 and includes a forward surface 26 and a rear surface which is on the opposite side of the plate 20 and therefore not depicted.

The console plate 20 further comprises a plurality of apertures 23, 25 which allow for adjustment in the lateral direction of the at least one mounting arm 30. This provides a first direction of adjustment between the at least one mounting arm 30 and the console plate 20. A plurality of adjustment apertures 27, 29 are also located on the console plate 22 and provide adjustment which is in a substantially vertical direction or alternatively, perpendicular to the adjustment provided by apertures 23, 25. It should be understood that the term "substantially vertical" does not necessarily mean absolutely vertical. One skilled in the art will understand that dashboard consoles are typically oriented at an angle which is not perfectly vertical and therefore, the term vertical as used herein merely means perpendicular or generally perpendicular to the lateral direction, side to side or substantially horizontal, movement of the mounting arms 30.

Also positioned on the console plate 20 is a wiring conduit aperture 28. The aperture 28 allows various power and signal conductors from sonar equipment mounted on or below the boat to communicate with the display 14.

Referring still to FIG. 2, the at least one mounting arm 30 is shown exploded above the console plate 20. While at least one mounting arm 30 may be utilized, where displays are all of a known size, an embodiment is depicted wherein two mounting arms 30, 32 are shown. The use of two mounting arms 30, 32 allows for variation of width in order to accommodate displays 14 of varying size, in the horizontal or lateral direction. This is useful because various manufacturers of sonar display equipment manufacture displays of varying size either between manufacturers or across varying lines of equipment from a single manufacturer. According to the instant exemplary embodiment, the mounting arms 30, 32 are generally L-shaped and include a first segment 34 which is mounted to the console plate 20 and a second segment 36 which extends from the console plate 20 and retains the display 14. The first segments 34, 36 include a first slot 38 and a second slot 40. The slots 38, 40 allow for lateral adjustments of the mounting arms 30, 32 relative to the console plate 20. The movement may be more finite than the distance of the separations provided between the apertures 23, 25. Otherwise stated, the apertures 23, 25 allow for adjustment at fixed intervals and the slots 38, 40 provide for improved adjustability between such distances of the apertures 23, 25. The spacing between the slots 38, 40 corresponds to the spacing between the apertures 27, 29, in the substantially vertical direction.

Depicted above the second arm 32 are a plurality of fasteners 42 which pass through the second segment 34 of the second arm 32 and through the console plate 20 in order to be fastened on the rear surface of the console plate 20. A lock nut or other structure may be utilized at the rear surface of the console plate 20 in order to receive the fasteners 42. It is desirable, according to one exemplary embodiment, that the fasteners 42 be intended to not require further adjustment of the second arm 32 once the assembly 12 is established. Accordingly, a plurality of locking nuts may be utilized at the rear surface of the plate 20 so that once tightened, the fasteners 42 are generally difficult to remove. Alternatively, a plurality of easily removable thumbscrews 44 are shown corresponding to the slots 38, 40 of the first arm 30.

It may be desirable that a first arm 30 include some ease of adjustment and not be of the more permanent nature as described with the second arm 32 mounting. The adjustability of the first arm 30 in the lateral direction, toward or away from the second arm 32, allows for easier disconnection of the display 14 from the display mounting assembly 12, for example when it may be desirable to disconnect the display 14 from the boat. Also such adjustability will allow for easy reconnection and wiring connection at the time of the repositioning of the display 14 and the first and second arms 30, 32.

Spaced apart from the second segment 36 are washers 60, 62 which provide for the ability to connect displays 14 of differing manufacturers to the first and second arms 30, 32. The washers generally have a connection feature 64 which connects with a mating feature 66, such as a slot disposed on outer ends of the second segment 36. The connection feature 64 of the instant embodiment is a male structure which is sized to fit within the mating feature 66 and inhibit rotation of the washers 60, 62 relative to the first and second arms 30, 32. The washers 60, 62 also include structure for engaging the display 14 which may vary from manufacturer to manufacturer of the different displays usable with the mounting assembly 12. Accordingly, the washers 60, 62 enable positioning of any of various manufactured displays to be used with the assembly 12, inhibit rotation of the display 14 once the assembly 12 is locked in a desired position and provide interchangeability for mounting of differing display types and sizes within the arms 30, 32. The washers 60,62 allow the use of multiple monitors or displays and therefore provide a means of easily upgrading electronics rather than requiring a new vehicle, for example a new boat.

Spaced apart from the second segment 36 opposite the washers 60, 62 are quick release knobs 70. These knobs provide a fastening structure to extend through the slots 66 and washers 60, 62 for engagement with the display 14. The knobs 70 may differ in structure and will be dictated by the manufacturer of the display 14. The knobs 70 provide for tightening of the washers 60, 62 into the display sides or opposing washer structures in order to fix the display 14 in position and inhibit unintended rotation of the display 14 relative to the mounting arms 30, 32. When desirable, the knobs 70 may be loosened in order to provide for removal of the display 14 from between the mounting arms 30, 32.

Figure 3:
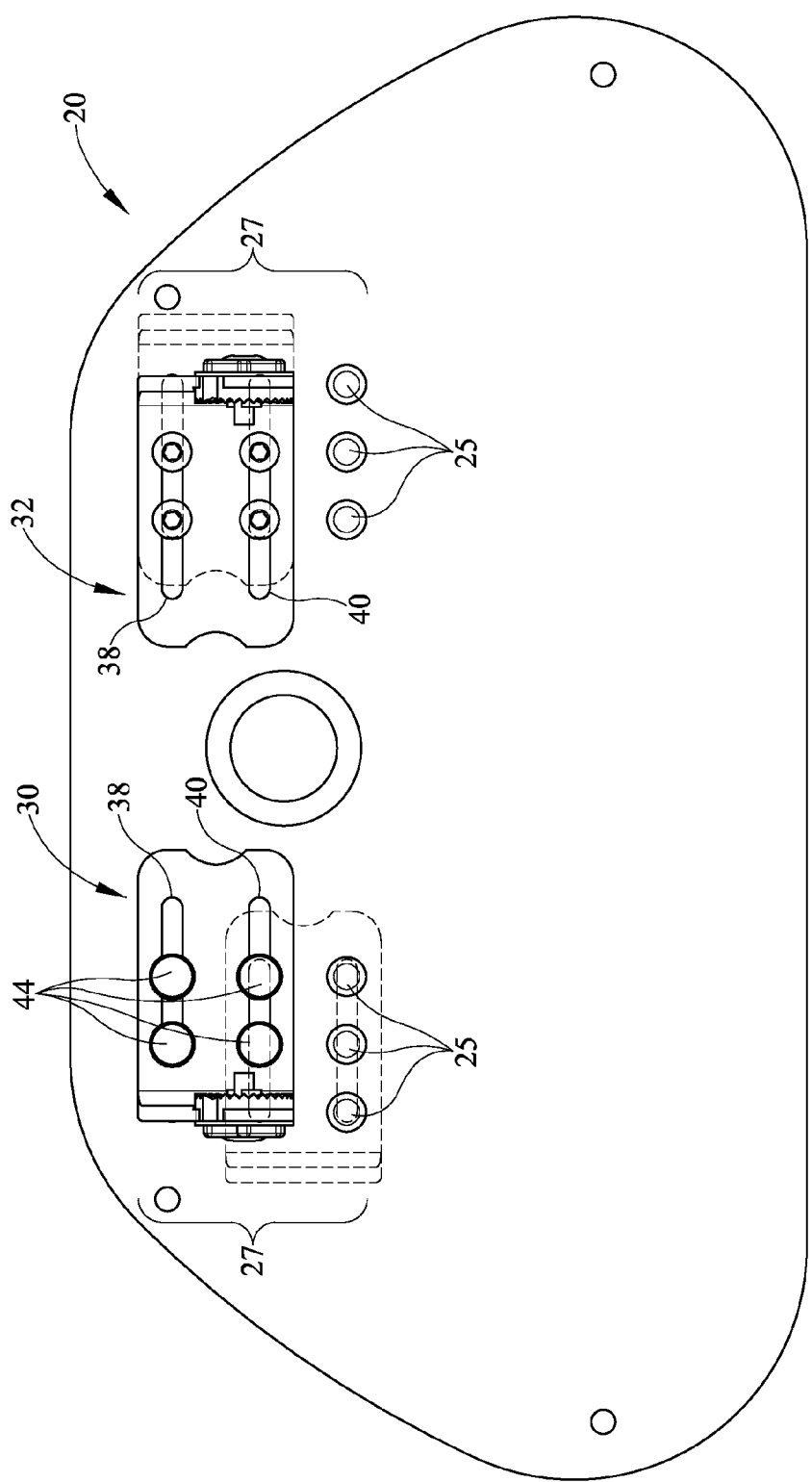
FIG. 3 is a front view of a console plate including various mounting positions for adjustable mounting arms.

Referring now to FIG. 3, a front view of the console plate 20 is depicted with the arms 30, 32 shown in various views. The arms 30, 32 are shown in both solid line and broken line in order to depict adjustability in both the vertical direction and in the horizontal or lateral direction relative to the console plate 20. The adjustability is provided in two parts. First, the rows of apertures 27 provide adjustability for the arms 30, 32 in the substantially vertical direction. Additionally, the console plate 20 includes multiple apertures 25 defining each row 27 providing lateral adjustment for the arms 30, 32. Even further, more fine adjustment capability is provided by utilizing slots 38, 40.

As depicted on the left-hand side of the figure, arm 30 is shown in a first position at an uppermost adjustment location in solid line and further is shown moved toward the center of the console plate 20. Broken line depictions of the arm 30 show the arm moved downwardly relative to the console plate and moved toward the left, or outward, away from the center position.

As shown on the right hand side of the figure, arms 32 shown in solid line in an uppermost position corresponding to the position of arm 30. The second arm 32 is shown in broken line in this uppermost position and moved outwardly from the center of the console plate 20. Thus the first and second arms 30, 32 may be moved to various positions in order to accommodate for size of display 14, positioning on the console plate 20 and ease of usability by the user, such as clearing the display from visual interference by the steering wheel of the boat. Additionally, the location of the display relative to the steering wheel precludes the user from having to extend a hand through an opening between steering wheel spokes to touch the display.

Figure 4B:
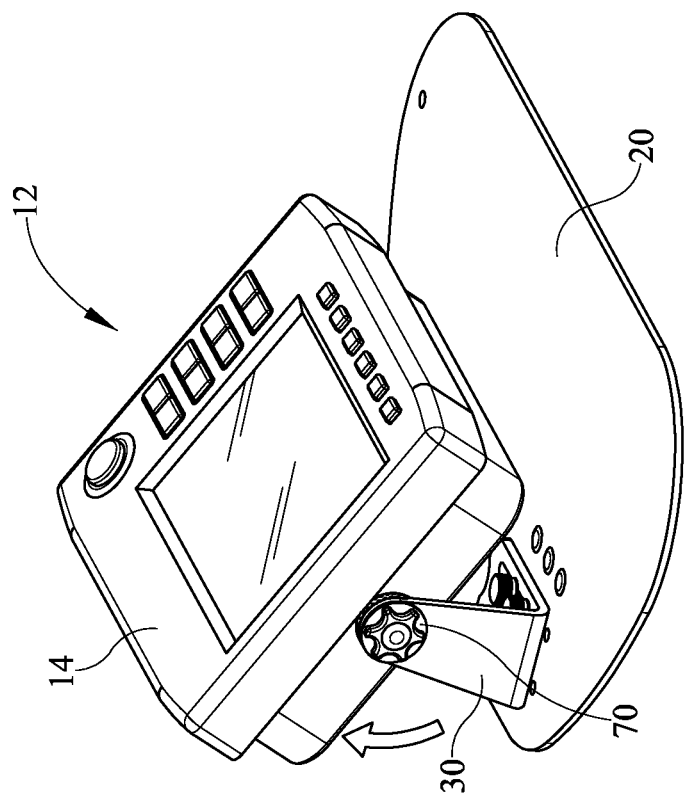
FIG. 4B is a perspective view of the mounting display disposed in a second position relative to the mounting arms.
Figure 4A:
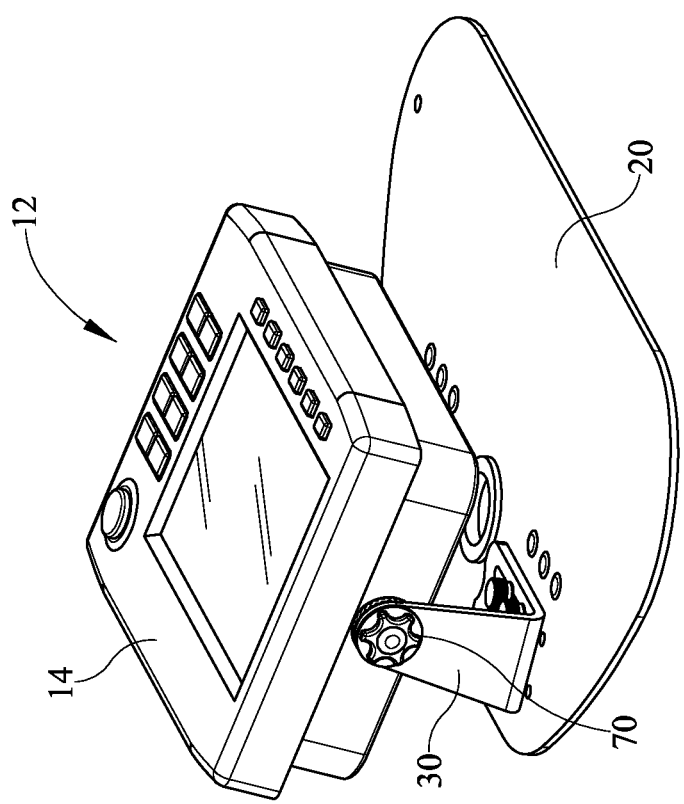
FIG. 4A is a perspective view of a mounting display disposed in a first position relative to the mounting arms.

Referring now to FIGS. 4A and 4B, the mounting assembly 12 is shown including the display 14. A further advantage of the instant embodiments provides that in addition to the adjustability of the mounting arms 30, 32 relative to the console plate 20, the display 14 is also rotatably adjustable relative to the arms 30, 32. In the embodiment shown in FIG. 4A, the display 14 is generally parallel to the console plate 20. However, in certain lighting conditions, and depending on the position of the boat relative to the sun, the sunlight may reflect from the display 14 causing glare and rendering the display hard to view and difficult to use. In such situation, the display 14 may be rotated as depicted in FIG. 4B, either downwardly or in the opposite direction from that which is depicted. Accordingly, the rotate ability of the display provides further adjustment for improved use of the GPS/sonar display equipment. Such adjustment is not available with a display which is flush mounted, or partially mounted into a boat console. In order to adjust the display 14 in the manner depicted in FIGS. 4A, 4B, the knobs 70 on each of the arms 30, 32 are rotated to loosen the washers 60, 62 (FIG. 2). Once the washers are loosened from engagement with the display 14, the display 14 may be rotated as depicted.

Figure 5:
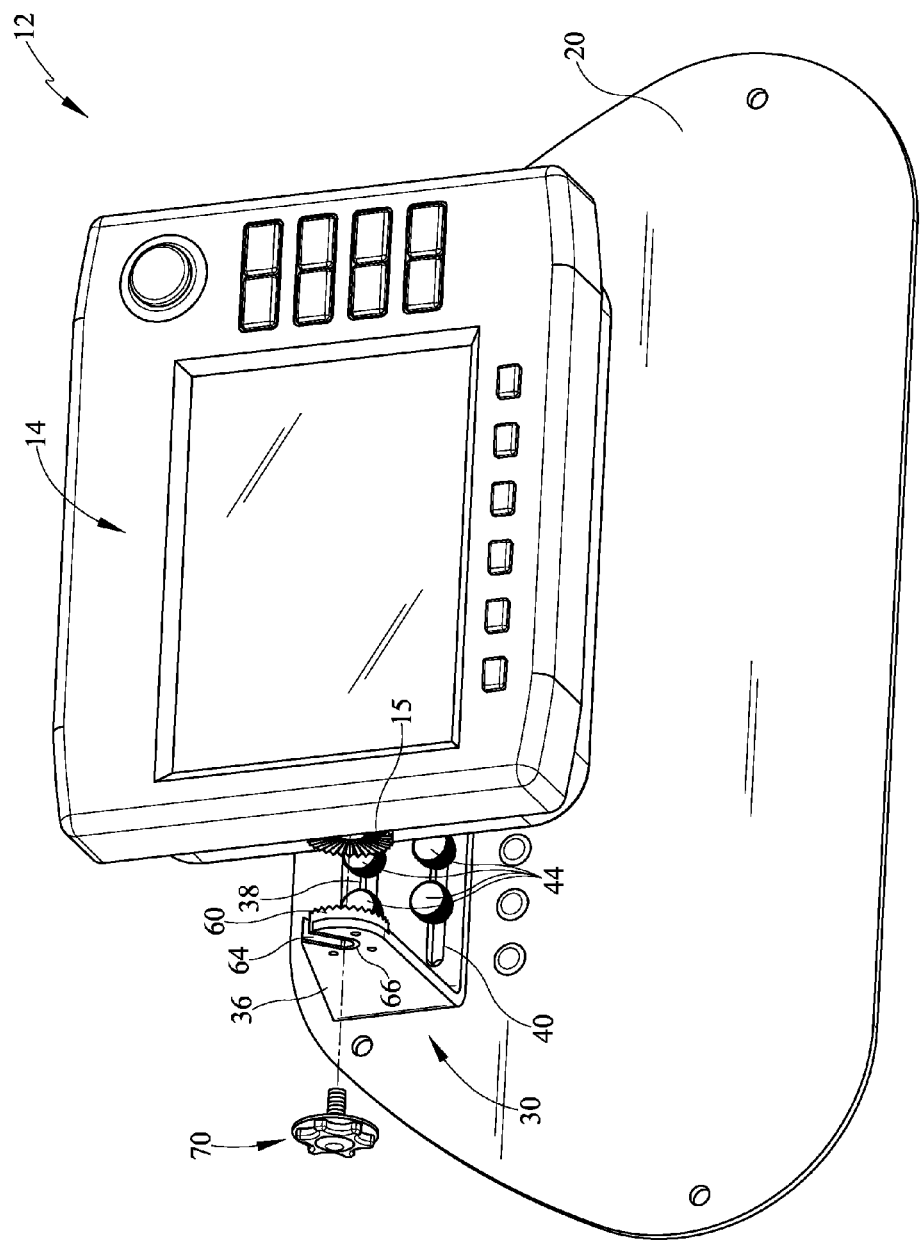
FIG. 5 is a perspective view of an exemplary sonar display being mounted to the mounting arms.

Referring now to FIG. 5, the GPS/sonar display mounting assembly 12 is depicted in perspective view with the display or team partially connected to the assembly 12. The first arm 30 is loosened by loosening the fasteners 44 to allow slidable movement of the first arm 30 relative to the console plate 20. The slots 38, 40 allow for fine adjustment of the arm movement 30 toward and away from the display 14. The washer 60 is chosen by determining a specific size washer which is needed to correspond with manufacturer specs of the display 14. In the exemplary embodiment, the washer 60 includes a plurality of teeth 65 which engage corresponding teeth 15 on the display. The teeth 65 and teeth 15 engage one another when the arm 30 is properly positioned relative to the display 14 and upon tightening of the knob 70 and engage one another therefore inhibiting rotation of the display relative to the arm 30. Similar structure is used in the second arm 32 and opposite side of the display 14, both of which are not shown in this view. The washer 60 includes a male component 64 which is positioned within the slot 66 provided in the segment 36 of arm 30. The male engagement between washer 60 and slot 66 provides a locking arrangement inhibiting rotation of the washer 60 relative to the arm segment 36. Next, by connecting the teeth 15 of the display 14 to the washer 60, the display 14 is also inhibited from rotation. The washer 60 and slot 66 provide a pathway for a fastener extending from the knobs 70 to engage and be received by the display 14 for tightening of the display to the assembly 12.

Figure 6:
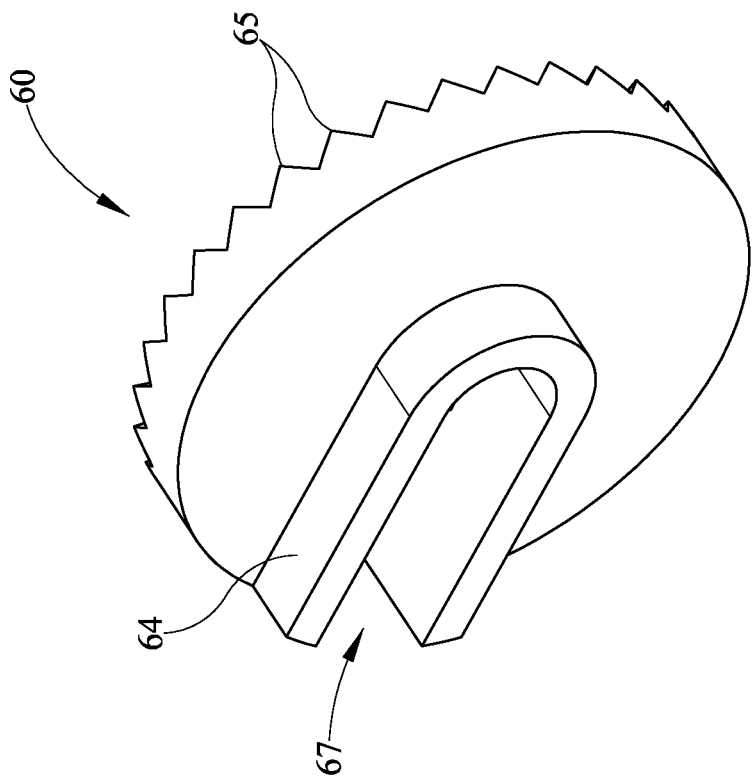
FIG. 6 is a perspective view of an exemplary washer which may be utilized to allow connection of various display manufacturers to the mounting assembly.

Referring now to FIG. 6, the washer 60 is depicted in a side perspective view. The washer includes the plurality of teeth along one side engagement of corresponding anti-rotation features on the display or on a corresponding washer structure engaging the display. On an opposite surface of the washer 60 is a male feature 64 which extends into the slot 66 of the arms 30, 32. The feature 64 allows passage of knob 70 through the washer 60 and into engagement with the display 14. The exemplary washer 62 is of similar construction to the washer 60 depicted herein.

In manufacturing these washers, the mating feature 64 need only be manufactured to mate with the slot 66 designed into the first and second arms 30, 32. The teeth or other engagement structure 65 may then be formed in different forms to match the mating structure provided by the display manufacturers. Thus, washers may be provided in a kit or sold independently for the various manufacturers of displays 14.

Figure 7:
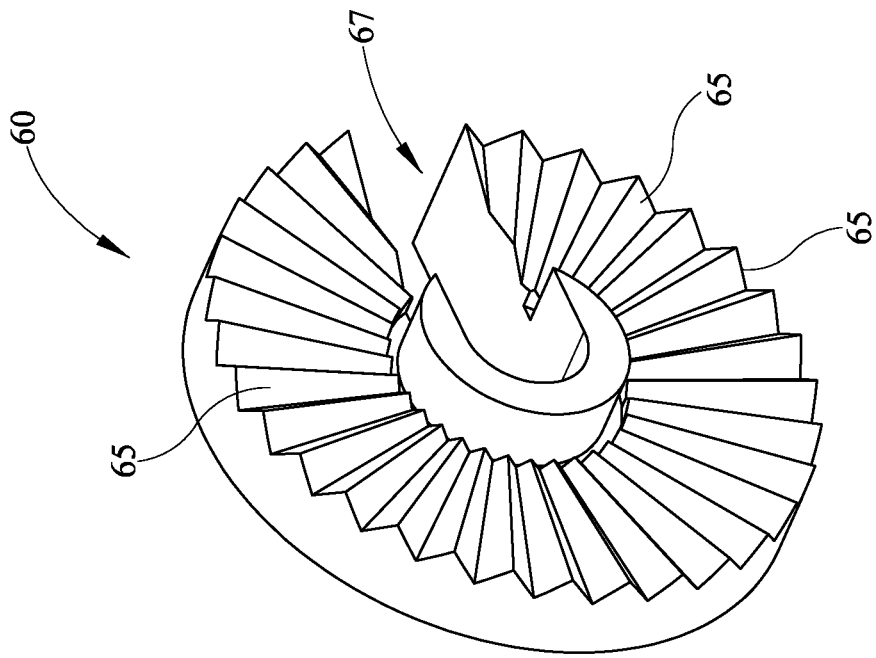
FIG. 7 is a perspective view from an alternate side of the exemplary washer of FIG. 6; and, FIG. 8 is a perspective view of an alternative washer design.

Referring now to FIG. 7, a perspective view of the washer 60 is depicted from an opposite side of that depicted in FIG. 6. In this view, the teeth 65 are depicted having a plurality of peaks and valleys. Alternatively, the teeth may be formed of arcuate segments of raised and lowered portions, but which do not have the peaks and valleys depicted in the instant embodiments. The washer 60 is generally C-shaped or U-shaped to provide a slot or opening 67 which matches the slot 66 size and location. This opening 67 may be sized so that when the washer 60 is seated within the slot 66, the knobs 70 and fastener 72 fit through the washer opening or slot 67. With brief reference again to FIG. 2, the arm 32 includes a notch or cutaway area wherein the washer 62 may be seated. This feature may be slightly seen in the first arm 30 in the depicted view.

Figure 8:
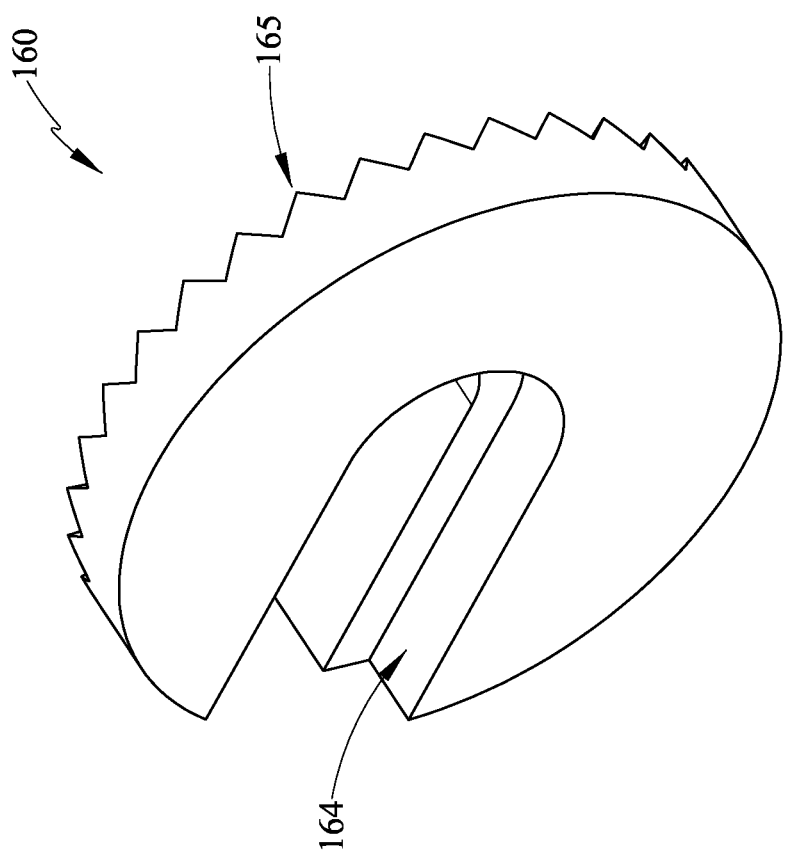

Referring now to FIG. 8, alternative washer 160 is depicted. In this embodiment, the washer does not comprise a male structure 64 as in the previous embodiment, but instead has a female notch 164 to receive a male mating feature which may be formed on the first and second arms 32. Additionally, teeth 165 are shown on the washer 160. The large number of teeth provide for additional fine adjustment of the angle of the display 14 during rotational adjustment. However, other teeth structures or rotational inhibiting features may be utilized which provide more or less adjustment while retaining the display at a desired angular position relative to the console plate 20.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A GPS/sonar mounting assembly, comprising:
 a console plate for positioning on a marine craft dashboard;
  a first L-shaped mounting arm connected to said console plate;
  a second L-shaped mounting arm connected to said console plate, said first mounting arm and said second mounting arm being independently adjustable in a first lateral direction and at least one of said first and second mounting arms being adjustable when mounted to said console plate;
  said first and second mounting arms being movable to various positions in a second direction perpendicular to said lateral direction and formed separately of said console plate;
  said first and second directions of adjustment being along said surface of said console plate and being provided between said console plate and one surface of each of said first and second L-shaped mounting arms;
  at least one of said first mounting arm and said second mounting arm having an easily removable fastener for connection to said console plate;
  said mounting arms each having a depression and a replaceable washer mounted in said depression to allow tilting adjustment of a display.

2. The GPS/sonar mounting assembly of claim 1, said first and second mounting arms receiving replaceable washers.

3. The GPS/sonar mounting assembly of claim 2, said replaceable washers including one of a fitment for engaging said first and second mounting arms and a receiver for engaging said first and second mounting arms for inhibiting rotation of said replaceable washer relative to said mounting arms.

4. The GPS/sonar mounting assembly of claim 3, said replaceable washers including one of a fitment for engaging said display and a receiver for engaging said display.

5. The GPS/sonar mounting assembly of claim 2, said replaceable washer having a plurality of teeth inhibiting rotation of said display relative to said washer.

6. The GPS/sonar mounting assembly of claim 5, said replaceable washers allow connection of displays of different manufacturers with said first and second mounting arms.

7. The GPS/sonar mounting assembly of claim 6 further comprising a quick release connect for retaining said display between said first and second mounting arms.

8. The GPS/sonar mounting assembly of claim 1, said first and second mounting arms spacing said display from said console plate.

9. The GPS/sonar mounting assembly of claim 1, said tilting adjustment allowing reduction of glare on said display.

10. The GPS/sonar mounting assembly of claim 1, said mounting assembly being adjustable in two planar directions and rotatable about an axis parallel to said planar directions.

11. The GPS/sonar mounting assembly of claim 1, further comprising a wire port passing through said plate for sonar system wires.

12. A GPS/sonar mounting display assembly, comprising:
 a console plate positionable on a dashboard of a vehicle;
  a first mounting arm and a second mounting arm separately formed and connected to said console plate in a generally cantilevered configuration;

at least one of said first and second mounting arms being individually adjustable in a first direction when mounted to said console plate and adjustable in a second direction relative to said console plate;

said mounting arms including a plurality of slots allowing adjustment in said first direction and said mounting plate including apertures aligned in said second direction so that said mounting arms may be adjusted in said two directions which are substantially perpendicular;

said first and second mounting arms, each having an end and a washer disposed in a surface depression near said end allowing rotatable adjustment of a display disposed between said first and second mounting arms.

13. The GPS/sonar mounting assembly of claim 12, ends of said first and second mounting arms being spaced from said console plate.

14. The GPS/sonar mounting assembly of claim 13, said display pivotable at said ends of said first and second mounting arms.

15. The GPS/sonar mounting assembly of claim 14, further comprising an interchangeable washer at said ends of said first and second mounting arms.

16. A GPS/sonar mounting assembly, comprising:
a console plate which is mounted to a marine craft;
a first mounting arm movable in a first lateral direction relative to said console plate and a second mounting arm movable in said first lateral direction relative to said console plate when at least one of said first and second mounting arms is mounted to said console plate;
said mounting arms having a segment extending outwardly from said console plate, said segment having a length greater than a depth of a GPS or sonar device used therewith;
said first mounting arm and said second mounting arm being movable in a second direction substantially perpendicular to said first lateral direction along a surface of said console plate;
said mounting arms having a plurality of slots in said first direction and said console plate having multiple rows of apertures extending in said second direction;
first and second washers connectable to said first and second mounting arms respectively in depressions of said first and second mounting arms, said washers and said mounting arms having corresponding radially extending slots.

* * * * *